(12) United States Patent
Bourdin et al.

(10) Patent No.: US 10,583,666 B2
(45) Date of Patent: Mar. 10, 2020

(54) INK COMPOSITION

(71) Applicant: Domino UK Limited, Cambridge (GB)

(72) Inventors: Claire Bourdin, Trumpington (GB); Jonathan Morgan, Cottenham (GB)

(73) Assignee: Domino UK Limited, Cambridge (GB)

( * ) Notice: Subject to any disclaimer, the term of this patent is extended or adjusted under 35 U.S.C. 154(b) by 375 days.

(21) Appl. No.: 15/510,354

(22) PCT Filed: Sep. 10, 2015

(86) PCT No.: PCT/GB2015/052618
§ 371 (c)(1),
(2) Date: Mar. 10, 2017

(87) PCT Pub. No.: WO2016/038373
PCT Pub. Date: Mar. 17, 2016

(65) Prior Publication Data
US 2017/0260412 A1 Sep. 14, 2017

(30) Foreign Application Priority Data
Sep. 12, 2014 (GB) .................................. 1416165.7

(51) Int. Cl.
*B41J 2/21* (2006.01)
*B41J 2/01* (2006.01)
*C09D 11/328* (2014.01)
*C09D 11/106* (2014.01)
*G01K 11/16* (2006.01)
*C09D 11/50* (2014.01)
(Continued)

(52) U.S. Cl.
CPC ............... *B41J 2/2107* (2013.01); *B41J 2/01* (2013.01); *C09D 11/102* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,630,869 A * 5/1997 Amon ...................... B41M 3/14
106/31.37
5,633,109 A 5/1997 Jennings et al.
(Continued)

FOREIGN PATENT DOCUMENTS

CN 103725103 A 4/2014
EP 0327788 A2 8/1989
(Continued)

OTHER PUBLICATIONS

International Searching Authority, Search Report and Written Opinion for International Application PCT/GB2015/052618 dated Oct. 22, 2015, 10 pages.
(Continued)

*Primary Examiner* — Manish S Shah
(74) *Attorney, Agent, or Firm* — Price Heneveld LLP

(57) ABSTRACT

The present invention relates to an inkjet ink including a photo-chromic colorant and a UV absorber. The ink may be used as a time-temperature indicator and is particularly useful in packaging food and/or drink to provide an indication of the quality of the contents.

28 Claims, 9 Drawing Sheets

(51) Int. Cl.
*C09D 11/102* (2014.01)
*C09D 11/14* (2006.01)
*C09D 11/38* (2014.01)
*C09D 11/52* (2014.01)
*G01K 3/04* (2006.01)
*G01K 11/12* (2006.01)

(52) U.S. Cl.
CPC ............ *C09D 11/106* (2013.01); *C09D 11/14* (2013.01); *C09D 11/328* (2013.01); *C09D 11/38* (2013.01); *C09D 11/50* (2013.01); *C09D 11/52* (2013.01); *G01K 3/04* (2013.01); *G01K 11/12* (2013.01); *G01K 11/16* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,807,625 A * | 9/1998 | Amon | B41M 3/142 283/72 |
| 5,846,682 A | 12/1998 | Murofushi et al. | |
| 6,770,687 B1 * | 8/2004 | Tan | B41M 3/148 106/31.14 |
| 8,007,900 B2 | 8/2011 | Hoekstra et al. | |
| 8,403,558 B2 | 3/2013 | Fuchs et al. | |
| 2004/0029989 A1 * | 2/2004 | Veya | C09D 11/101 522/49 |
| 2005/0113481 A1 * | 5/2005 | Sabys | C09D 11/30 523/160 |
| 2007/0211110 A1 * | 9/2007 | Iftime | C09D 11/101 347/52 |
| 2010/0309268 A1 * | 12/2010 | Van Dyck | B41J 11/002 347/102 |
| 2014/0198167 A1 | 7/2014 | Iftime et al. | |

FOREIGN PATENT DOCUMENTS

| | | |
|---|---|---|
| EP | 1498447 A1 | 1/2005 |
| WO | 2005075978 A2 | 8/2005 |
| WO | 2005105874 A1 | 11/2005 |
| WO | 2008104468 A1 | 9/2008 |
| WO | 2009121148 A1 | 10/2009 |
| WO | 2010037660 A1 | 4/2010 |

OTHER PUBLICATIONS

Great Britain Intellectual Property Office, Search Report for Great Britain Application GB 1416165.7 dated Dec. 2, 2014, 2 pages.

Samoladas et al., Photochromic behavior of spiropyran in polystyrene and polycaprolactone thin films—Effect of UV absorber and antioxidant compound, Dyes and Pigments, available online Feb. 5, 2007, pp. 368-393.

Di Credico et al., Microencapsulation of a UV-Responsive Photochromic Dye by Means of Novel UV-Screening Polyurea-Based Shells for Smart Coating Applications, ACS Applied Materials and Interfaces, 2013, vol. 5, pp. 6628-6634.

* cited by examiner

INK COMPOSITION

FIELD OF THE INVENTION

The present invention relates to an inkjet ink comprising a photo-chromic colorant and a UV absorber. The ink may be used as a time-temperature indicator and is particularly useful in packaging food and/or drink to provide an indication of the quality of the contents.

BACKGROUND TO THE INVENTION

The invention relates to the printing of indicating codes or marks which vary in colour as a function of temperature over time (time-temperature indicator). The practice of labelling foodstuffs with best before, use by or sale by dates is widespread around the world. In many regions the use of such codes is driven by legislation that is designed to ensure that food is safe to consume. The choice of use by date is generally made using a conservative set of assumptions based around worst case scenarios for storage temperature and shipping times in the supply chain. The use-by date on packaging does not inform about a particular state of the food, but simply reports the date when food stored in worst case conditions is not safe to eat. It follows, therefore, that a large quantity of food is discarded when it is still safe to eat. Best before dates are also chosen with no knowledge of how a consumer will transport or store the food that they have purchased. The use of these codes again leads to food being discarded because it has spoiled before the expiry of the code.

During storage and transit, temperature is one of the most important factors influencing the rate of microbial growth in and the amount of physical and chemical deterioration in food products. It is therefore useful to report the time-temperature history along the cold chain, so that the consumer can make an informed choice about the food products they choose, and the suppliers of food products can use a less conservative set of assumptions in setting use-by dates. A model time-temperature indicator would be a simple, cost-effective and provide an easily understood indication that the temperature and time history of the food product means that it is of good quality and safe to consume.

A common approach to producing time-temperature indicator technology is to make use of a reversible photo-activated reaction that yields a colour change upon activation. Such materials have an initial colour, which is changed when activated with light of a suitable wavelength and then revert to their original colour over time. The rate of change of colour of the photo-activated compound in such indicators can be influenced by exposed temperature. However, the use of reversible photo-activated reactions as the basis of indicating codes or marks can lead to reactivation/resetting of the code by re-exposing the code or mark to light of a suitable wavelength. In many cases recharging of the colour is easily achieved by ambient light, even after initial activation by UV or after fading of the colour of the photo-chromic species stored at high temperature. It is, therefore, important to protect the activated time-temperature indicating code from further activation, in order to protect the integrity of the code.

A variety of approaches have been used to address this problem within the state of the art. U.S. Pat. No. 8,007,900 discloses time-temperature indicators protected from additional light exposure by a UV-Vis filter (a light absorbing layer) applied by thermal transfer or inkjet printing immediately after the activation of the photo-chromic colorant. The light absorbing layer contains a binder and ultra-violet absorbers.

WO 2005/075978 relates to a photo-chromic colorant introduced into or atop a support matrix. The time temperature indicator is then optionally provided with a protector, which prevents the renewed photo-induced coloration of the reversible indicator. The protector may be a protective coating or a laminate that comprises a filter, for example a polypropylene colour filter, which filters out certain wavelength ranges.

U.S. Pat. No. 8,403,558 discloses a time-temperature indicator comprising one layer containing a photo-chromic colorant into a matrix substrate, and a transparent colourless or transparent coloured light absorbing layer applied atop. A UV light absorber, a polymeric binder and other additives, such as optical brighteners, form the light absorbing layer.

It can be readily understood that all of the solutions proposed so far involve the use of a light absorbing layer that is either applied or printed atop the layer containing the photo-chromic colorant. The application of a top layer is costly, time-consuming and requires the complex set-up of a production line, involving the co-ordination of several pieces of in-line processing equipment.

Accordingly, it would be desirable to provide an improved inkjet ink and an improved time temperature indicator (TTI). In particular it would be desirable to provide a simpler and more economical time temperature indicator.

It is one object of the present invention to overcome or address the problems of prior art inks and TTI's or to at least provide commercially useful alternatives thereto. It is an alternative and/or additional object to provide an inkjet ink and TTI which is cheaper to make and/or more effective than known inkjet inks/TTI's.

SUMMARY OF THE INVENTION

In the first aspect of the present invention there is provided an inkjet ink comprising:
 a photo-chromic colorant; and
 a UV absorber.

The present inventors have surprisingly found that the incorporation of a UV absorber within the inkjet ink prevents and/or reduces the recharging of the time-temperature indicator when exposed to ambient light, without, as one would expect, preventing the initial activation of the photo-chromic colorant. Furthermore, the UV absorber also does not substantially affect the colour change of the indicator over time. Providing the UV absorber within the inkjet ink obviates the need for a further protective layer atop the time temperature indicator.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

In a further aspect of the present invention there is provided a deposit comprising the ink as described herein.

In a further aspect of the present invention there is provided an article comprising the deposit as described herein.

In a further aspect of the present invention there is provided a cartridge comprising the ink as described herein.

In a further aspect of the present invention there is provided a time temperature indicator comprising the ink and/or the deposit as described herein.

In a further aspect of the present invention there is provided a method of activating the time-temperature indicator as described herein, comprising:
providing the ink and/or the deposit as described herein, preferably on a substrate; and
exposing the ink and/or the deposit to UV light.

In a further aspect of the present invention there is provided a method of producing the ink as described herein, the method comprising mixing a photo-chromic colorant and a UV absorber.

In a further aspect of the present invention there is provided the use of the ink as described herein as a time temperature indicator.

Other preferred embodiments of the device and methods according to the invention appear throughout the specification and in particular in the example.

BRIEF DESCRIPTION OF THE DRAWINGS

These and other aspects of the invention will now be described with reference to the accompanying Figures, in which.

DETAILED DESCRIPTION OF THE INVENTION

Figure 1:
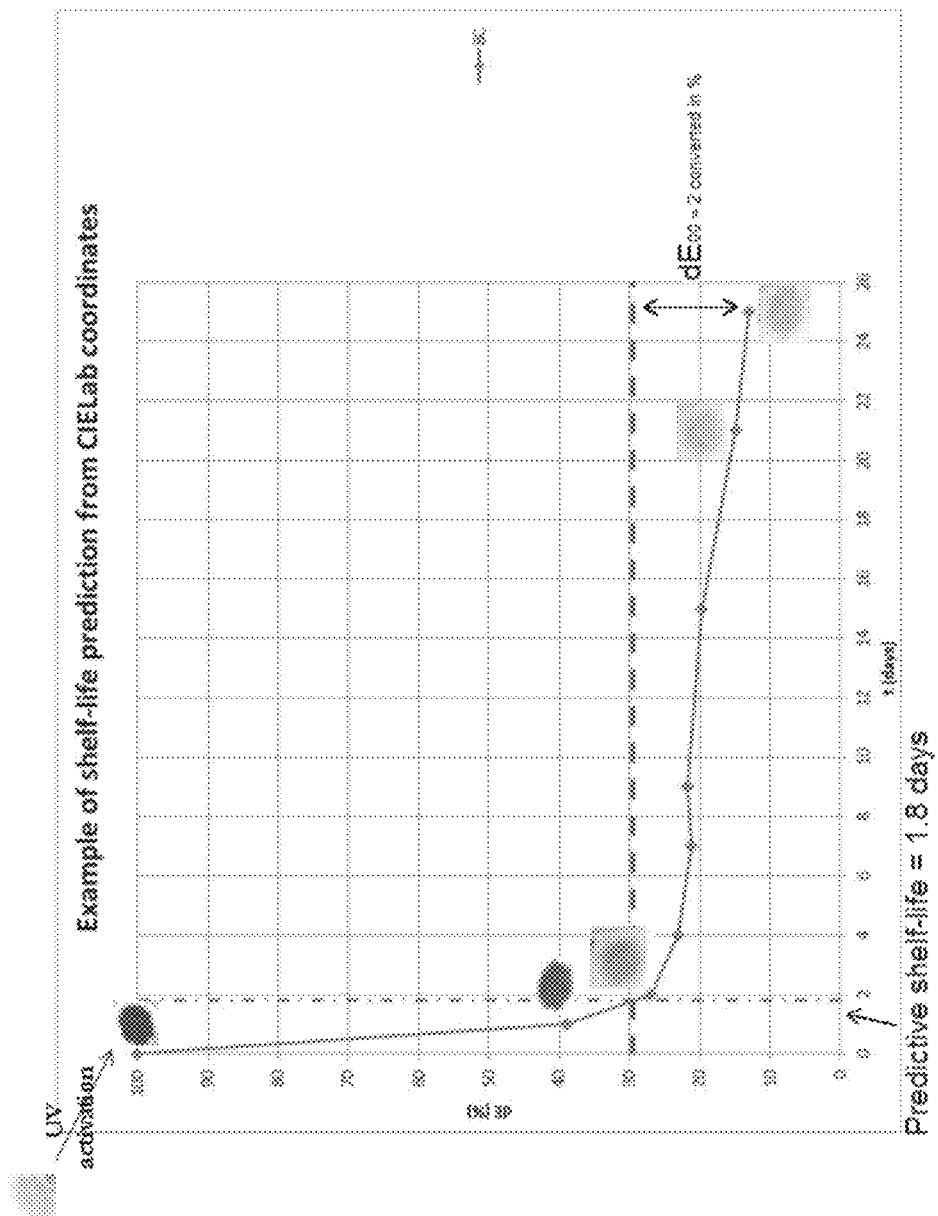
FIG. 1 shows the life-time of an ink as described herein and the rate at which it fades at 8° C.

Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition.

As used herein, the term "activation" or "activating" refers to the chemical reaction caused by UV light which changes the initial colour of the photo-chromic colorant. For example, a spiropyran activated by UV light (i.e, a photomerocyanine) has a different colour to the deactivated spiropyran due to the ring opening chemical reaction caused by the UV light.

The term "reverse reaction" refers to the chemical reaction of the colorant from the activated form to the deactivated form. For example, when the colorant is initially a spiropyran, the reverse reaction refers to the thermally assisted ring closing reaction of the photomerocyanine form to the spiropyran form.

The activation and reverse reactions of an exemplary spiropyran are shown below:

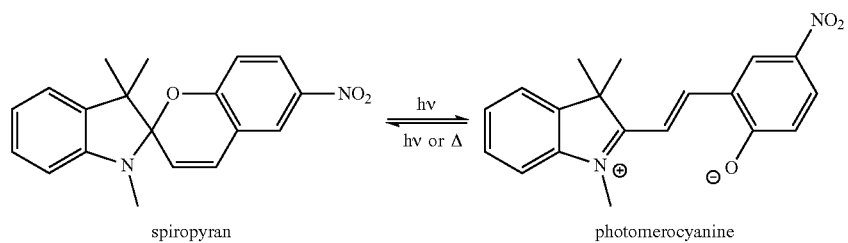

spiropyran    photomerocyanine

Activation of the colourless spiropyran by UV light induces opening of the ring by cleavage of the carbon-oxygen bond, resulting in the coloured merocyanine form. This reaction is reversible and the highly dipolar merocyanine form will close again if subjected to heat and/or time. Subsequently exposing the merocyanine for too long to light, for example UV light with a wavelength of 250 to 380 nm, will also promote ring closure because the light is thought to cause the molecule to heat up.

As used herein, the term "fading" refers to the colour change of the photo-chromic colorant as it undergoes the reverse reaction, thermally assisted, from the activated form to the deactivated form. For example, the colour of a photomerocyanine will fade as it undergoes the thermally assisted ring closing reaction to the colourless spiropyran form. The rate of fading corresponds to the rate of the reverse reaction, which depends on the temperature the colorant is exposed to.

The term "recharging" refers to the re-activating of an at least partially faded photo-chromic colorant by ambient and/or outdoor UV light.

In one embodiment of the present invention, there is provided an inkjet ink comprising:
a photo-chromic colorant; and
a UV absorber.

Without protection from UV light, once at least partially faded, a colorant could be recharged if subjected to UV or ambient light, which would cause the ink to have a colour that no longer provides a reliable indication of the conditions (temperature/time) it has experienced, and, when printed on to food packaging, the quality of the packaged food. To avoid false positives and fraud, it is therefore necessary to protect the photo-chromic colorant from UV and ambient light. Prior art methods of protecting the colorant have involved providing a further layer comprising UV absorbers, the disadvantages of which are discussed above.

To address this problem, the present inventors have now surprisingly found that the incorporation of a UV absorber within the inkjet ink prevents and/or reduces the recharging of the ink when exposed to ambient light, without, as one would expect, preventing the initial activation of the photo-chromic colorant and without substantially affecting the colour change of the indicator over time. The activated ink is therefore a reliable time-temperature indicator as it can provide accurate information regarding the amount of time that has elapsed and the temperature which it has experienced since its initial activation. When the ink is provided, for example, as a deposit on a food packaging and activated at the time of sealing food therein, it therefore also provides a reliable indication of the quality of the food. Providing the UV absorber within the inkjet ink obviates the need for a further protective layer atop the time temperature indicator.

Preferably the UV absorber has an absorbance peak broader than the absorbance peak of the deactivated photo-chromic colorant (e.g. a spiropyran). Without wishing to be bound by theory, it is thought that activation of the ink reduces the absorbance peak of the activated colorant (e.g. the photomerocyanine) but surprisingly does not prevent activation of the colorant to take place. The UV absorber then preferably prevents and/or reduces significant recharging of the colorant by subsequent ambient UV light.

Advantageously, preferably, the photochemical process can be monitored visually, by the human eye, for example.

The rates of the reversible reaction and the corresponding colour change of the photo-chromic colorant may be affected by the respective concentrations of the colorant and the UV absorber, as well as by any substrate the ink is printed on. As a result, advantageously, the life-time or 'shelf-life' of the time temperature indicator/ink as described herein may be tuned to specific foods by varying the concentration of the ink components and/or varying the substrate.

Preferably, the photo-chromic colorant is a spiroaromatic compound. Spiroaromatic compounds are known to be suitable as indicator compounds in TTI systems and are discussed in WO 2005/075978. Spiroaromatic compounds consist structurally of two carbocycles connected through a single carbon atom from which four extending bonds are bonding other carbon or heteroatoms. Of the four bonds, extending from the Spiro carbon centre, at least one is to a heteroatom allowing bond cleavage and ring opening under controllable conditions.

Preferably the colorant is a spiropyran. Spiropyrans are one class of spiroaromatic compounds. Spiropyrans comprise a pyran ring linked by a spiro carbon to a heterocyclic ring.

Irradiation of the colourless spiropyran with UV light causes heterolytic cleavage of the C—O bond forming the ring-opened coloured species, often called the "merocyanine" form which can take on a cis-(1,2), trans-(1,3) or the ortho-quinoidal form. The pyran ring is usually a substituted benzopyran or naphthopyran but the heterocyclic component situated across the spirocarbon center can be chosen from a long list of ring systems such as, and not limited to, indole, benzothiazole, benzoxazole, benzoselenazole, quinoline, acridine, phenanthridine, benzopyran, naphthopyran, xanthane, pyrrolidine and thiazolidine.

Preferably the spiropyran is selected from 1,3,3-trimethylindolino-6'-nitrobenzopyrylospiran (also called 1',3',3'-trimethyl-6-nitrospiro[1(2H)-benzopyran-2,2'-indoline), 1,3-dihydro-1,3,3-trimethylspiro[2H-indole-2,3'-[3H]naphtho[2,1-b][1,4]oxazine], 1',3'-dihydro-8-methoxy-1',3',3'-trimethyl-6-nitrospiro[2H-1-benzopyran-2,2'-(2H)-indole], 3,3-diphenyl-3H-naphtho[2,1-b]pyran, or mixtures of one or more thereof. More preferably the spiropyran is 1,3,3-trinnethylindolino-6'-nitrobenzopyrylospiran.

Preferably the colorant is present in an amount of from 0.5 to 10 wt %, based on the total weight of the ink. More preferably, the colorant is present in an amount of from 0.5 to 9 wt %, or from 1 to 8 wt %, or from 2 to 7 wt %, or from 3 to 6 wt %, based on the total weight of the ink. Most preferably the colorant is present in an amount of from 4 to 6 wt %, or about 5 wt %, based on the total weight of the ink.

UV light absorbers ("UV absorbers") are widely known and commercially available. Preferably the UV absorber is an acrylic resin and/or a styrene maleic anhydride copolymer.

Preferably the amount (e.g. at least 4 wt %, or at least 5 wt %, or at least 6 wt %, or at least 7 wt %, or at least 8 wt %, or at least 9 wt % based on the total weight of the ink) of the UV absorber is high enough to prevent the photo-chromic colorant (and therefore the ink itself) from recharging to its original colour when exposed to ambient light (which may comprise minor amounts of UV light), without affecting the physical or end-user properties of the ink. Preferably the amount (e.g. 15 wt % or less, or 12 wt % or less, or 11 wt % or less, or 11 wt % or less based on the total weight of the ink) of UV absorber is low enough to allow the temperature of the activated photo-chromic colorant to increase in ambient light such that the reverse (deactivation) reaction is favoured and hence the colour of the ink continues to fade in a predictable manner. Furthermore, preferably the UV absorber is present in an amount low enough to allow the photo-chromic colorant to be activated when initially exposed to UV light.

Preferably the UV absorber is present in an amount of from 4 to 15 wt %, based on the total weight of the ink. More preferably, the UV absorber is present in an amount of from 5 to 12 wt %, or from 6 to 12 wt %, or from 7 to 11 wt %, or from 8 to 11 wt % based on the total weight of the ink. Most preferably, the UV absorber is present in an amount of from 9 to 11 wt %, or about 10 wt %, based on the total weight of the ink.

Preferably the ink further comprises a solvent. The solvent preferably complies with food packaging regulations and substantially/completely dissolves the photo-chromic colorant. Preferably, the solvent comprises a volatile organic solvent. Preferably the solvent comprises a ketone, more preferably a ketone having four carbon atoms. More preferably still, the solvent comprises butan-2-one (methylethyl ketone (MEK)), as MEK-based inks for continuous inkjet (CIJ) technology are well known, in addition to enhancing the properties of the ink, in particular dry-time.

Preferably the solvent is present in an amount of from 60 to 90 wt %, or from 65 to 85 wt %, based on the total weight of the ink. More preferably, the solvent is present in an amount of from 70 to 80 wt %, or about 75 wt %, based on the total weight of the ink.

Preferably the ink further comprises a binder. Suitable binders include polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose acetates, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins and mixtures of two or more thereof. Such binders are commercially available. Preferably the binder is a cellulose resin and/or a rosin ester resin. More preferably, the binder is a pentaerythritol ester of a hydrogenated rosin.

Preferably the binder is present in an amount of from 5 to 15 wt %, or from 7 to 14 wt %, or from 8 to 12 wt %, based on the total weight of the ink. More preferably, the binder is present in an amount of from 9 to 11 wt %, or about 10 wt %, based on the total weight of the ink.

Preferably the ink further comprises an additive. Preferably the additive is a polyether siloxane copolymer.

Preferably the additive is present in an amount of from 0.1 to 2 wt %, or from 0.2 to 1.8 wt %, or from 0.4 to 1.6 wt %, or from 0.5 to 1.5 wt %, based on the total weight of the ink. More preferably, the additive is present in an amount of from 0.7 to 1.3 wt %, or from 0.8 to 1.2 wt %, or from 0.9 to 1.1 wt %, or about 1 wt %, based on the total weight of the ink.

Preferably the ink further comprises a salt. Providing a salt is advantageous because it improves the conductivity of the CIJ ink.

Preferably the salt is an ammonium salt and/or a bromide salt. More preferably, the salt is an ammonium salt. Ammonium salts are particularly suitable for food packaging applications.

Preferably the salt is present in an amount of from 0.5 to 5 wt %, or from 0.8 to 4 wt %, or from 1 to 3 wt %, based on the total weight of the ink. More preferably, the salt is present in an amount of from 1.5 to 2.5 wt %, or about 2 wt %, based on the total weight of the ink. The amount should be as low as possible, for example, 5 wt % or lower, or 3 wt % or lower, or 2.5% or lower, to prevent affecting the adhesion properties of the ink onto the substrate.

Preferably the ink has a viscosity of from 2 to 6 cP, or from 2.5 to 5.5 cP, or from 3 to 5 cP, at 25° C. More preferably, the ink has a viscosity of from 3.5 to 4.5 cP, or about 4 cP, at 25° C. The viscosity of the ink may be measured using a viscometer such as a Brookfield DV-II+ viscometer or a rheometer.

Preferably the ink has a conductivity ($\sigma$) of more than 450 $\mu$S/cm, or of more than 500 $\mu$S/cm, more preferably of more than 550 $\mu$S/cm. Alternatively, preferably, the ink has a conductivity ($\sigma$) of from 450 $\mu$S/cm to 5,000 $\mu$S/cm, or of from 500 $\mu$S/cm to 3,000 $\mu$S/cm, or of from 550 $\mu$S/cm to 2,000 $\mu$S/cm.

Providing an ink with the above viscosity and/or conductivity is advantageous because these properties are particularly favourable for use in CIJ technologies.

In one embodiment of the present invention, there is provided a deposit comprising the ink as described herein.

In one embodiment of the present invention, there is provided an article comprising the deposit as described herein. Preferably the article comprises food packaging and/or drink packaging. More preferably, the article comprises food packaging.

In one embodiment of the present invention, there is provided a cartridge comprising the ink as described herein.

In one embodiment of the present invention, there is provided a time temperature indicator comprising the ink and/or the deposit as described herein.

In one embodiment of the present invention, there is provided a method of activating the time-temperature indicator as described herein, comprising:

providing the ink and/or the deposit as described herein, preferably on a substrate;

exposing the ink and/or the deposit to UV light.

Preferably, exposing the ink and/or the deposit to UV light thereby activates at least a portion of the time temperature indicator.

Any suitable substrate may be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc. Preferably the substrate comprises food packaging and/or drink packaging. More preferably, the substrate comprises food packaging.

Preferably the UV light has a wavelength of from 300 to 450 nm, or from 325 to 425 nm, or from 340 to 410 nm. More preferably, the UV light has a wavelength of from 350 to 400 nm, or from 360 to 400 nm. Alternatively, preferably, the UV light has a wavelength of 350 to 380 nm, or from 360 to 370 nm, or about 365 nm. Alternatively, preferably, the UV light has a wavelength of 380 to 410 nm, or from 390 to 400 nm, or about 395 nm. Preferably the UV light is provided at an intensity of at least 1.5 W/cm$^2$, or of at least 1.75 W/cm$^2$. More preferably the UV light is provided at an intensity of at least 2 W/cm$^2$, or of at least 2.2 W/cm$^2$. Alternatively, preferably, the UV light is provided at an intensity of from 1.5 to 3 W/cm$^2$, or from 1.75 to 2.5 W/cm$^2$, or from 2 to 2.4 W/cm$^2$, or about 2.25 W/cm$^2$. Surprisingly, providing the UV light to the ink as described herein at such wavelengths and/or intensities is advantageous because it is thought to activate the photo-chromic colorant without instead being completely absorbed by the UV absorber alone.

Preferably the UV light is provided to the ink and/or deposit at a distance of from 0.5 to 1,000 mm away from the ink and/or deposit, more preferably from 0.5 to 500 mm away from the ink and/or deposit, or from 0.5 to 250 mm away from the ink and/or deposit, most preferably from 1 to 100 mm away from the ink and/or deposit, or from 10 to 50 mm away from the ink, or about 20 mm away from the ink.

Preferably, the UV light is provided by one or more UV light emitting diodes (LEDs) and/or one or more mercury arc lamps. For example, a mercury arc lamp with a maximum power 477 W could be used to activate the ink at 30%, 40% or 50% of its maximum power. However the colour of the activated ink may be fainter than an ink activated by a UV LED. Therefore, more preferably, the UV light is provided by one or more UV LEDs.

Preferably the ink is provided by inkjet printing.

Preferably, the ink is provided or printed (e.g. inkjet printed) as a "best before date", particularly in the case of the substrate comprising food and/or drink packaging. The use of a "best before date" is advantageous because it provides a safety net i.e. it preferably prevents a false positive from the time temperature indicator.

In one embodiment of the present invention, there is provided a method of producing the ink as described herein, the method comprising mixing a photo-chromic colorant and a UV absorber. The inkjet ink is formulated by combining the components using methods known in the art.

In one embodiment of the present invention, there is provided the use of the ink as described herein as a time temperature indicator.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The following non-limiting examples further illustrate the present invention.

EXAMPLES

Example 1

An ink comprising a photo-chromic colorant, 1,3,3-trimethylindolino-6'-nitrobenzopyrylospiran, was inkjet printed onto a substrate and activated by a 365 nm UV lamp at a distance of 20 mm from the substrate at an intensity of 2.25 W/cm$^2$. The ink did not contain a UV absorber and so the colorant was not protected from UV light.

To assess the rate of fading of the ink, the colour co-ordinates of the ink were recorded by a spectroeye before activation by UV light, and at 0, 1, 2, 3, 5, 7, 9, 15, 20 and 30 days after activation. The ink was not subjected to UV or ambient light during this time and was kept at 8° C. The colour difference ($\Delta E$) between the colour before activation and the colour at time "t" after activation was calculated using formula I:

$$\Delta E_{00} = \sqrt{[(dL/S_L')^2 + (dC/S_C')^2 + (dH/S_H')^2 + R_T dC'/S_C' dH'/S_H']}$$ (Formula I)

The components of Formula I are calculated using the formulae below, disclosed in, for example, "Sharma, Gaurav; Wu, Wencheng; Dalal, Edul N. (2005)."The CIEDE2000 color-difference formula: Implementation notes, supplementary test data, and mathematical observations". Color Research & Applications (Wiley Interscience) 30 (1): 21-30. doi:10.1002/col.20070."

$$L_{avg} = (L_1 + L_2)/2$$

$$dL_{00} = dL/S_L'$$

$$a_1' = a_1(1+G)$$

$$a_2' = a_2(1+G)$$

$$G = 0.5(1 - \sqrt{(C_{avg}^7/(C_{avg}^7 + 25^7))})$$

$$C_{avg} = (C_1 + C_2)/2$$

$$C_1' = \sqrt{(a_1'^2 + b_1^2)}$$

$$C_2' = \sqrt{(a_2'^2 + b_2^2)}$$

$$C'_{avg} = (C_1' + C_2')/2$$

$$dC' = C_2' - C_1'$$

$$h_1' = \tan^{-1}(b_1/a_1')$$

$$h_2' = \tan^{-1}(b_2/a_2')$$

$$h'_{avg} = (h_1' + h_2')/2$$

$$dh' = H_2' - H_1'$$

$$dH' = 2\sqrt{(C_2' - C_1')}\sin(dh'/2)$$

$$S_L' = 1 + 0.015(L_{avg} - 50)^2/\sqrt{(20 + (L_{avg} - 50)^2)}$$

$$S_C' = 1 + 0.045 C'_{avg}$$

$$S_H' = 1 + 0.015 C'_{avg} T$$

$$T = 1 - 0.17\cos(h'_{avg} - 30°) + 0.24\cos(2h'_{avg}) + 0.32\cos(3h'_{avg} + 6°) - 0.20\cos(4h'_{avg} - 63°)$$

$$R_T = -2\sqrt{[C'^7_{avg}/(C'^7_{avg} + 25^7)]}\sin[60°\cdot\exp(-[(h'_{avg} - 275°)/25°]^2)]$$

$L_2$, $a_2$, $b_2$, $C_2$ and $h_2$ are colour space measurements of the sample at a certain time after UV activation; and $L_1$, $a_1$, $b_1$, $C_1$ and $h_1$ are colour space measurements of the sample after activation by UV lamp.

When $\Delta E_{00} \leq 2$, there is no noticeable colour difference according to a human eye.

When $\Delta E_{00} > 2$ there is a noticeable colour difference according to the human eye.

In Example 1, the first value of $\Delta E_{00}$ (dE) obtained was considered as 100%, and colour loss (fading) was plotted against time. The results are shown in FIG. 1 and show that, in 25 days, the colour of the colorant faded to around 10% of its colour after initial activation, i.e around 90% of its colour was lost. Kept at 8° C. the colorant may be used to provide an indication of the time lapsed after its initial activation, up to at least 25 days. The same is true at other temperatures. At higher temperatures, the colour of the colorant will fade faster than at lower temperatures.

Example 2

The time-temperature indicator ink is prepared by addition of CAB-551-0.01 and Foralyn 110 as binders, Tego-Glide 410 as additive, tert-butyl ammonium nitrate as salt, and Joncryl682 as UV absorber to the solvent butan-2-one. Once dissolved, 1,3,3-trimethylindolino-6'-nitrobenzopyrylospiran used as photochromic material was added to the solution. CAB-551-0.01, Foralyn 110, TegoGlide 410, tert-butyl ammonium nitrate, Joncryl682, butan-2-one and 1,3,3-trimethylindolino-6'-nitrobenzopyrylospiran are all commercially available. The mixture was left stirring for at least 2 hours, and then filtered through a GF/B (1.0 μm) filter. The quantity of each component is provided in Table 1.

TABLE 1

| Material | Quantity (% wt) |
| --- | --- |
| CAB-551-0.01 | 9 |
| TG410 | 1 |
| TBAN | 2 |
| Foralyn 110 | 1 |
| SP1 | 5 |
| JONCRYL 682 | 10 |
| MEK | 72 |

The physical properties of the ink are shown in Table 2.

TABLE 2

| | |
| --- | --- |
| Conductivity (uS/cm) | 554-553 |
| Viscosity (cP) | 4.98-4.99 |
| Reflectance ratio (%) | 0.94 |

TABLE 2-continued

| | |
|---|---|
| Filtration time (s) | 26 |
| density (g/cm³) | 0.8807 |
| density (SG) | 0.8019 |

The ink is then printed by a CIJ printer as a rectangle on a polyethylene terephthalate (PET) substrate.

The colour before and after activation by UV lamp (365 nm) is recorded by a Spectroeye, as shown in Table 3.

TABLE 3

| | before activation | after activation |
|---|---|---|
| D | 0.6 | 1.51 |
| L* | 66.14 | 34.24 |
| a* | 33.3 | 51.78 |
| b* | 13.97 | 10.39 |
| h | 22.76 | 11.35 |

Figure 2:
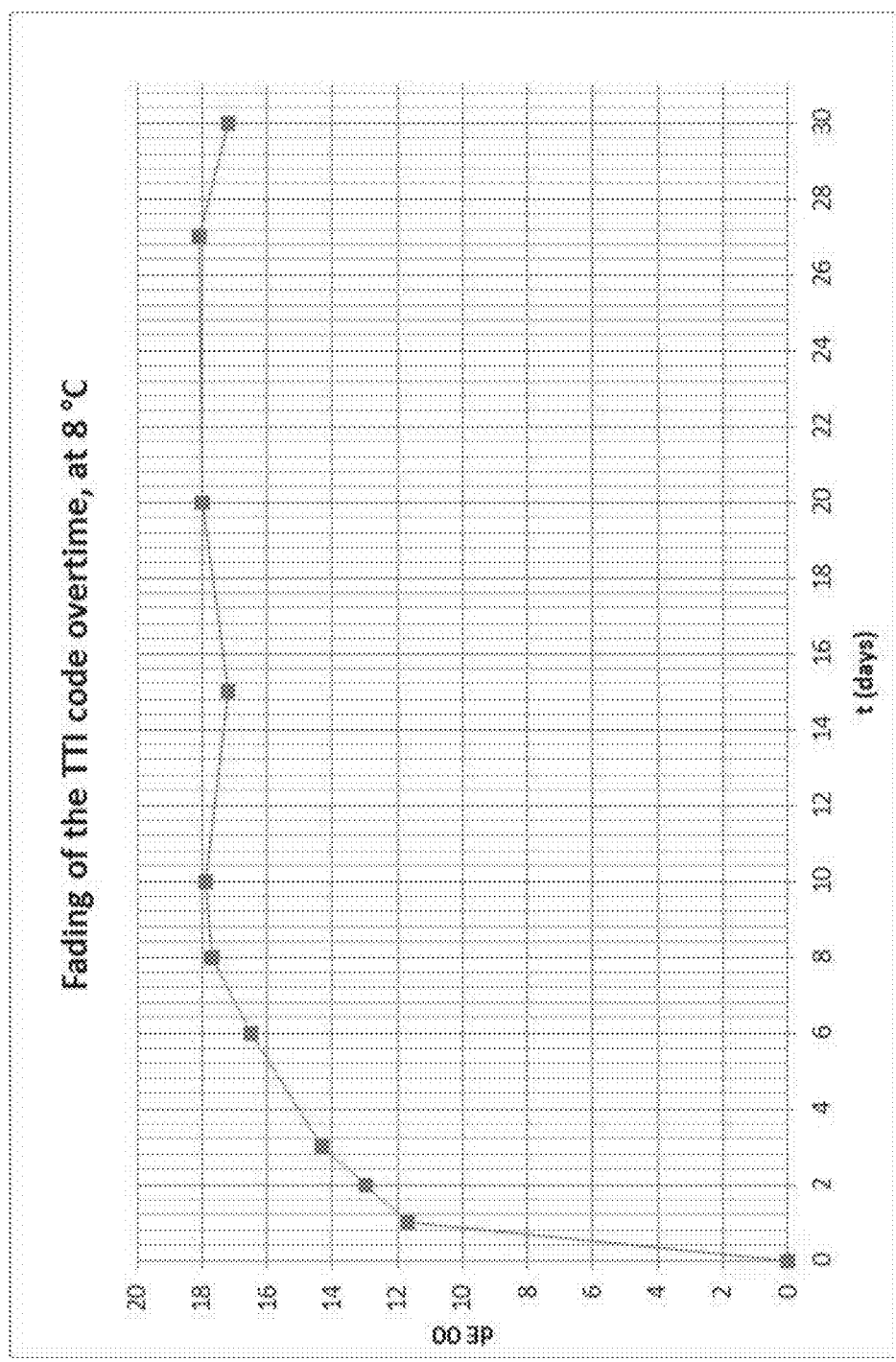
FIG. 2 shows the rate at which the printed ink fades on PET substrate at 8° C.

The TTI ink life-time was followed by monitoring the colour change using the Spectroeye, and the results are shown in FIG. 2, which shows the colour fading over time on PET substrate at 8° C.

Example 3

The performance of the ink of Example 2 was compared to an ink without a UV absorber therein. The photo-chromic colorant in the respective inks was 1,3,3-trimethylindolino-6'-nitrobenzopyrylospiran. The two inks were printed onto a plastic (polyethylene terephthalate (PET)) substrate and were tested on their resistance to being recharged under outdoor/ambient UV light. First, the respective inks were kept in the dark (i.e. no exposure to UV/ambient light) for 34 days at 8° C. During this time, the colour change from initial activation was recorded using a spectroeye. Both inks faded as the colorant molecule went from the photomerocyanine form to the colourless spiropyran form, i.e. the ink became deactivated.

After 34 days, the inks were exposed to ambient UV light. The colour coordinates of the inks were recorded with a spectroeye after 1, 5, 10 and 30 min of exposure to ambient UV light. The results are shown in FIG. 9 and plotted in FIG. 3.

Figure 3:
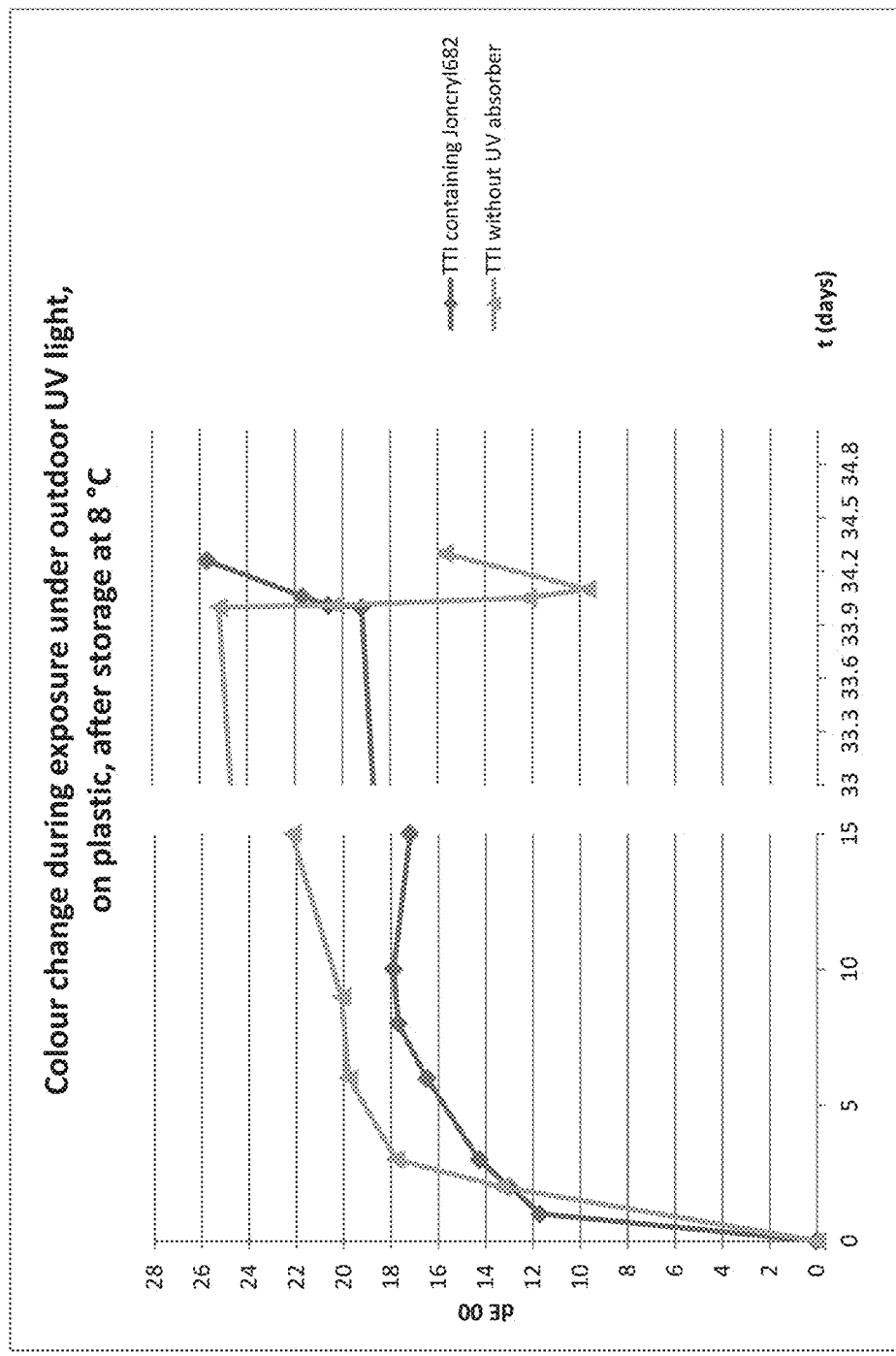
FIG. 3 shows a comparison between an ink of the present invention and an ink without a UV absorber, showing the colour changes observed once the ink with the UV absorber and the ink without the UV absorber are exposed to ambient light.
Figure 9:
FIG. 9 shows a comparison between an ink of the present invention and an ink without a UV absorber, showing the colour changes observed once the ink with the UV absorber and the ink without the UV absorber are exposed to ambient light.

FIG. 9 and FIG. 3 show that the TTI containing UV absorber does not recharge up to its original colour, and there is a visual noticeable difference of colour between the colour after activation and the colour after the TTI is subjected to outdoor light.

The results show that the colour of the ink without UV absorber substantially recharges after 10 minutes of exposure to a colour very different to its colour after 34 days in the dark ($dE_{00}$>15). In fact, the ink recharges to a colour similar to its colour immediately after activation by UV lamp. The colour of the ink without UV absorber does not significantly fade thereafter.

In comparison, in the ink containing UV absorber, the ink appears to slightly recharge up to around 10 minutes after exposure to a colour which is still similar to its colour after 34 days in the dark ($dE_{00}$~2.5). The ink does not recharge to its colour immediately after its initial activation by UV lamp. After 10 minutes, the ink containing the UV absorber tends to heat up, promoting the ring-closing reaction whilst the UV absorber protects the colorant from substantial ring-opening. As a result, the equilibrium is pushed towards the reverse reaction (ring-closure). Thereafter there is no significant recharging and the reaction is reversed such that the photo-chromic colorant returns to its original form, hence the predictable fading of the colour of the ink.

The ink without UV absorber therefore provides a false positive as it no longer reliably indicates the time and temperature since activation. In contrast, the ink with the UV absorber does not recharge by a significant amount in UV light and fades in a predictable manner. It is therefore suitable for use as a time temperature indicator.

Example 4

Figure 4:
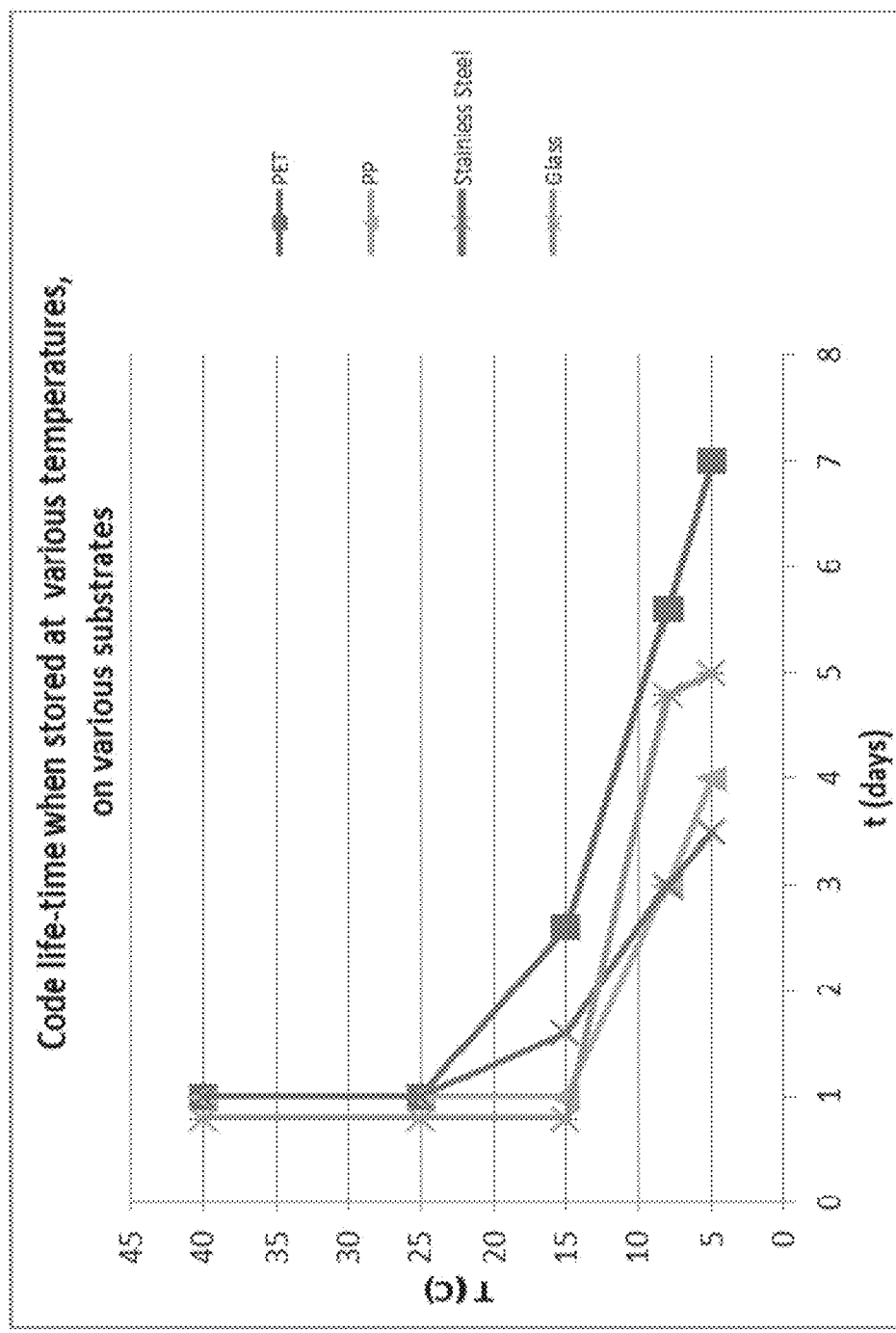
FIG. 4 shows the life-times of an ink as described herein at different temperatures and on different substrates.

The ink of Example 2 was printed on to a variety of different substrates. The life-times of the inks at different temperatures were measured and are shown in FIG. 4.

Example 5

In addition to the ink of Example 2 (hereafter "Ink 1"), two further time-temperature indicator inks, "Ink 2" and "Ink 3" were prepared by addition of CAB-551-0.01 and Foralyn 110 as binders, TegoGlide 410 as additive, tert-butyl ammonium nitrate as salt, and Joncryl682 as UV absorber to the solvent butan-2-one. Once dissolved, 1,3,3-trimethylindolino-6'-nitrobenzopyrylospiran as photo-chromic material was added to the solution. CAB-551-0.01, Foralyn 110, TegoGlide 410, tert-butyl ammonium nitrate, Joncryl682, butan-2-one and 1,3,3-trimethylindolino-6'-nitrobenzopyrylospiran are all commercially available. The mixtures were left stirring for at least 2 hours, and then filtered through a GF/B (1.0 μm) filter. The quantity of each component is provided in Table 5.

TABLE 5

| Material | Ink 2 Quantity (% wt) | Ink 3 Quantity (% wt) |
|---|---|---|
| CAB-551-0.01 | 9 | 9 |
| TG410 | 1 | 1 |
| TBAN | 2 | 2 |
| Foralyn 110 | 1 | 1 |
| SP1 | 5 | 5 |
| JONCRYL 682 | 2 | 6 |
| MEK | 80 | 76 |

The physical properties of Inks 2 and 3 are shown in Table 6.

TABLE 6

| | Ink 2 | Ink 3 |
|---|---|---|
| Conductivity (uS/cm) | 1145 | 713 |
| Viscosity (cP) | 2.78-2.79 | 3.53 |

Inks 1, 2, and 3 were then printed by a CIJ printer as a rectangle on a polyethylene terephthalate (PET) substrate and a substrate made of PHBV-Enmat Y 1000, PEG400 and linalool (83:5:2% wt).

Figure 5:
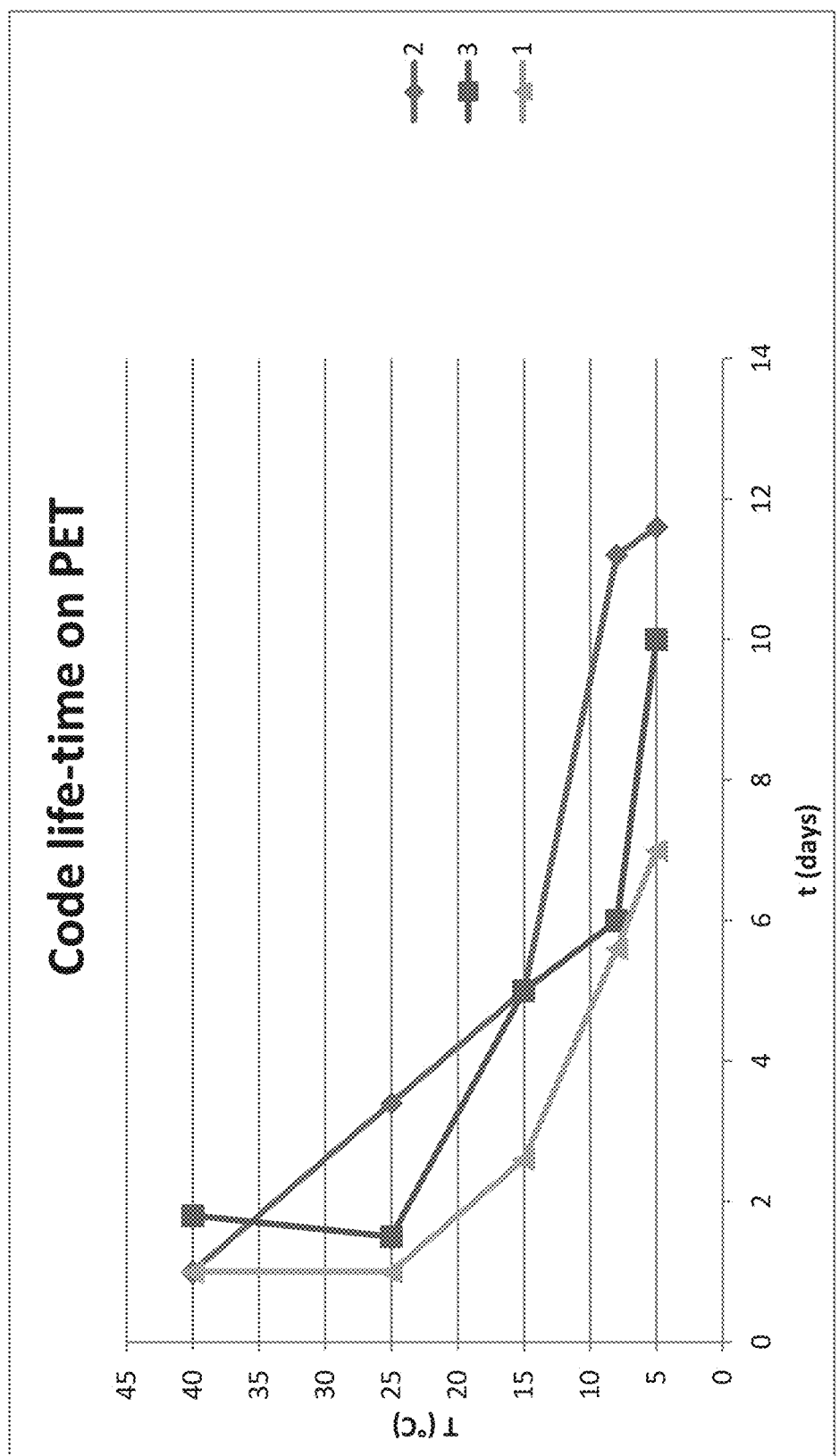
FIGS. 5 and 6 show the life-times of three inks as described herein at different temperatures and on different substrates and the effect thereon of the concentration of the UV absorber.
Figure 6:
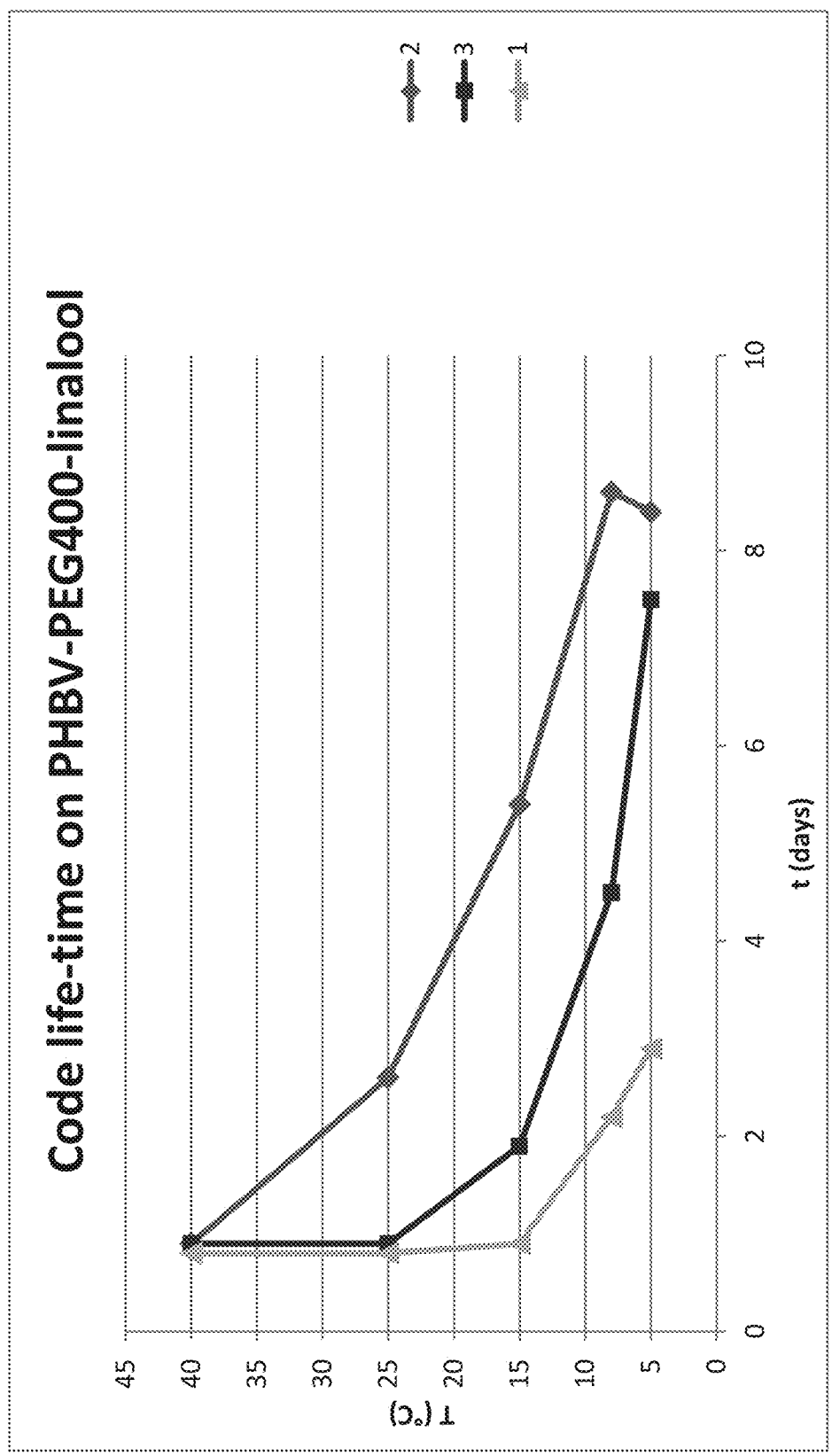

The life-time of the three TTI inks was followed by monitoring the colour change using the Spectroeye, and the results are shown in FIG. 5 and FIG. 6. These figures show the shelf-lives of TTI Inks 1, 2 and 3 when printed on either PET or PHBV-PEG400-linalool and stored at 5° C., 8° C., 15° C., 25° C. and 40° C. After the initial activation, the inks were not exposed to any further UV light.

The graphs in FIGS. 5 and 6 shows that variation of the concentration of the UV absorber in the formulation affects the shelf-life of the ink. Generally, the higher the concentration, the shorter the shelf-life at low temperatures, independently of the substrate. Knowledge of how the concentration affects the shelf-life allows the TTI ink to be tuned to different requirements, for example, foods with differing shelf-lives.

Example 6

A further TTI ink ("Ink 4") was prepared by addition of CAB-551-0.01 and Foralyn 110 as binders, TegoGlide 410 as additive, tert-butyl ammonium nitrate as salt, and Joncryl682 as UV absorber to the solvent butan-2-one. Once dissolved, 1,3,3-trimethylindolino-6'-nitrobenzopyrylospiran used as photo-chromic material was added to the solution. CAB-551-0.01, Foralyn 110, TegoGlide 410, tert-butyl ammonium nitrate, Joncryl682, butan-2-one and 1,3,3-trimethylindolino-6'-nitrobenzopyrylospiran are all commercially available. The mixture was left stirring for at least 2 hours, and then filtered through a GF/B (1.0 μm) filter. The quantity of each component is provided in Table 7.

TABLE 7

| Material | Ink 4 Quantity (% wt) |
|---|---|
| CAB-551-0.01 | 12.8 |
| TG410 | 1 |
| TBAN | 2 |
| Foralyn 110 | 5 |
| SP1 | 5 |
| JONCRYL 682 | 2 |
| MEK | 72.7 |

The physical properties of the ink are shown in Table 8.

TABLE 8

| INK | 4 |
|---|---|
| Conductivity (uS/cm) | 633 |
| Viscosity (cP) | 6.03 |

Ink 2 (see Example 5) and Ink 4 were then compared. The two inks were printed by a CIJ printer as a rectangle on a polyethylene terephthalate (PET) substrate.

Figure 7:
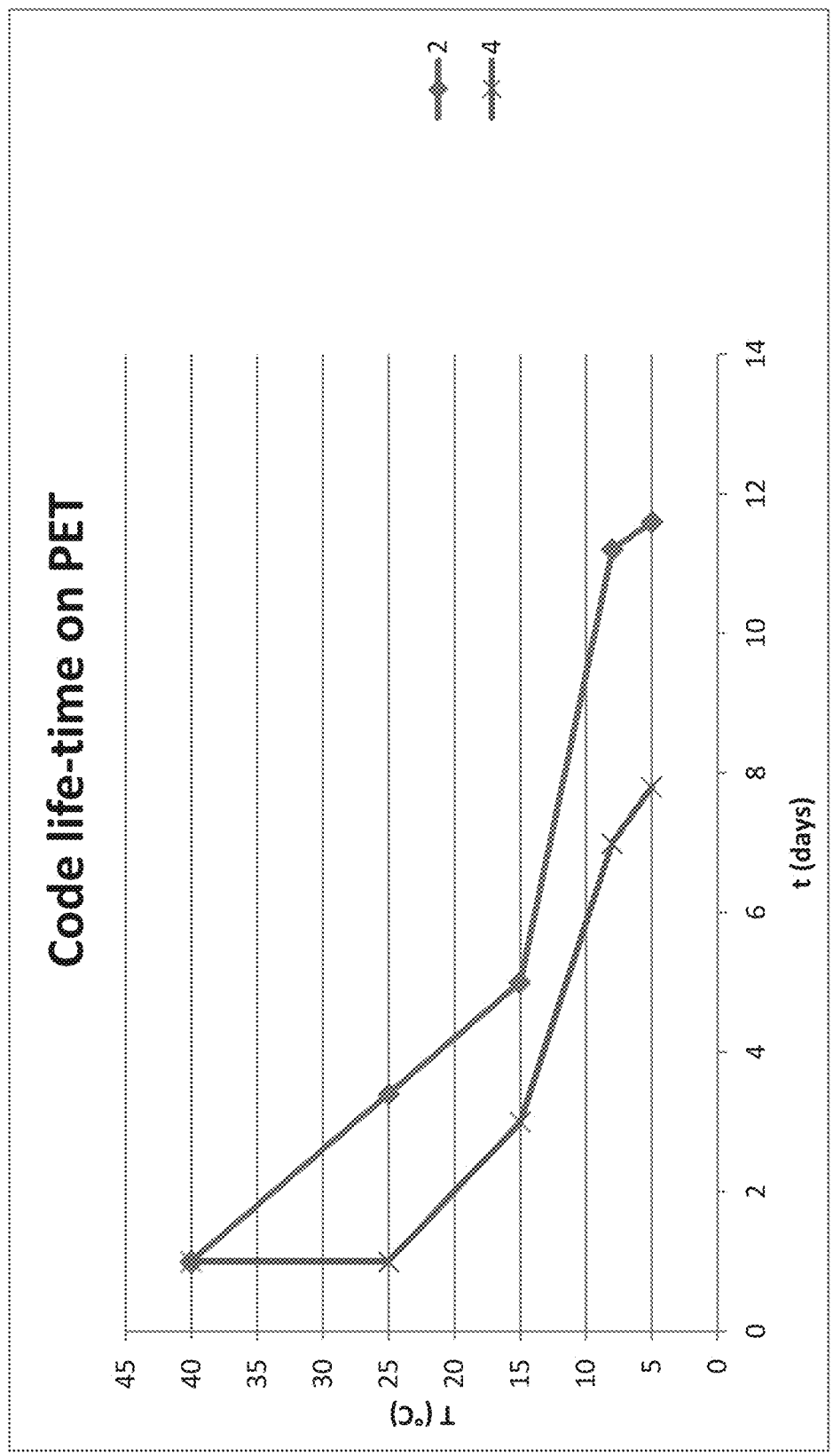
FIG. 7 shows the effect of varying the concentration of binder (polymer) or additives on the shelf-life of the TTI ink on a specific substrate.

The life-time of the two TTI inks was followed by monitoring the colour change using the Spectroeye, and the results are shown in FIG. 7, which represents the shelf-lives of printed TTI Inks 2 and 4 when the stored at 5° C., 8° C., 15° C., 25° C. and 40° C.

The graph (FIG. 7) shows that varying the concentration of the binder (polymer) or additives may affect the shelf-life of the TTI ink on a specific substrate. The inks may therefore be tuned to foods or drinks having differing shelf-lives.

Example 7

Figure 8:
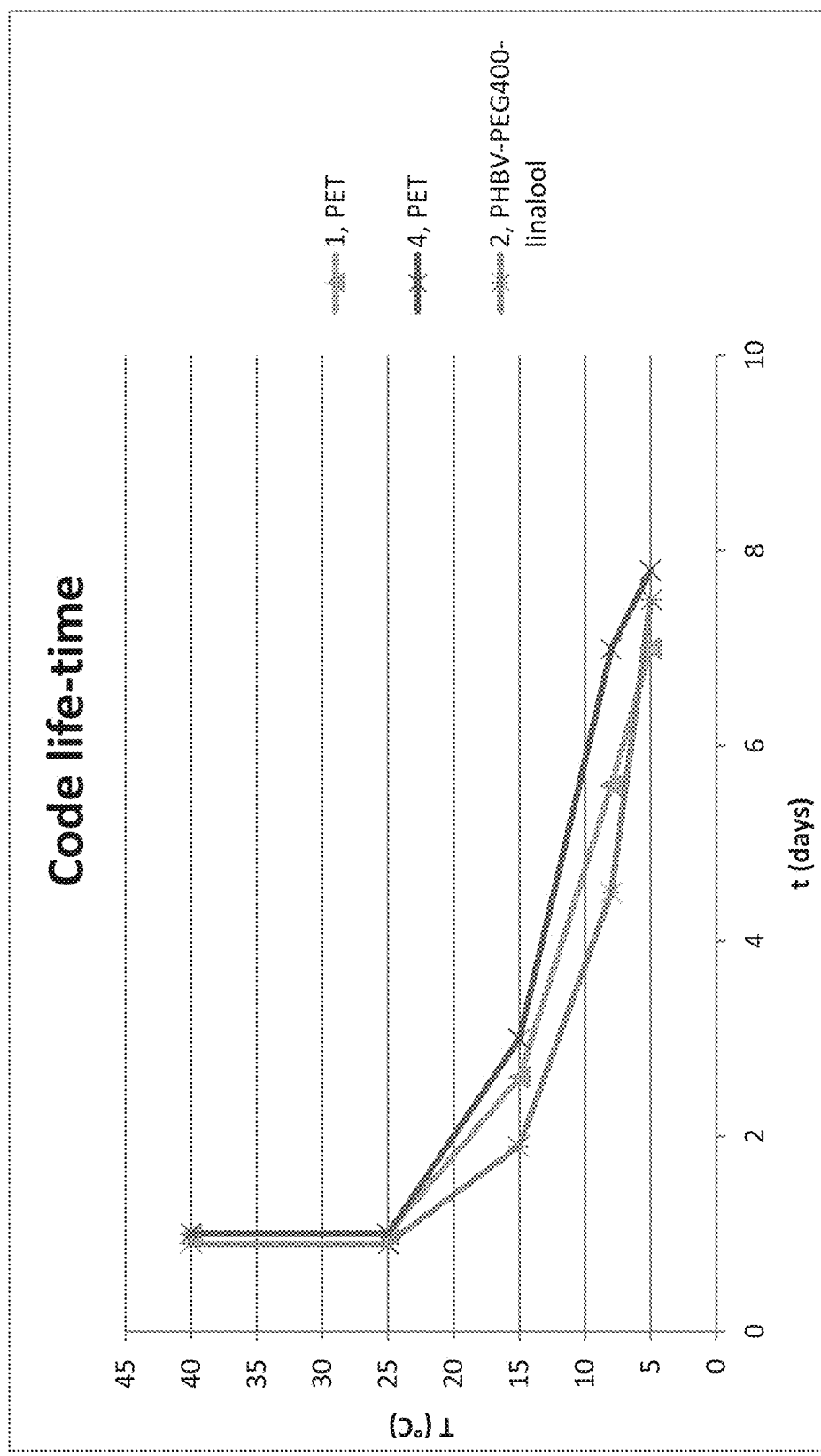
FIG. 8 shows the shelf-lives of three inks of the present invention on the same and different substrates.

The shelf lives of inks 1, 2 and 4 were compared on the same or differing substrates. FIG. 8 shows that similar shelf-lives for Inks 1, 2 and 4 can be achieved either on the same substrate (see Inks 1 and 4 on FIG. 8) or on different substrates (see Inks 1 and 4 on PET and Ink 2 on PHBV-PEG400-linalool, FIG. 8) despite the inks having differing compositions.

The invention claimed is:

1. An inkjet ink comprising:
   a photo-chromic colorant, wherein the colorant is a spiropyran; and
   a UV absorber, wherein the UV absorber is at least one of an acrylic resin and a styrene maleic anhydride copolymer, wherein the UV absorber is present in an amount of from 6 wt % to 15 wt %, based on the total weight of the ink.

2. The ink of claim 1, wherein the spiropyran is selected from 1,3,3-trimethylindolino-6'-nitrobenzopyrolospiran, 1,3-dihydro-1,3,3-trimethylspiro[2H-indole-2,3'-[3H]naphtho[2,1-b][1,4]oxazine], 1',3'-dihydro-8-methoxy-1',3',3'-trimethyl-6-nitrospiro[2H-1-benzopyran-2,2'-(2H)-indole], 3,3-diphenyl-3H-naphtho[2,1-b]pyran, or mixtures of one or more thereof, preferably wherein the spiropyran is 1,3,3-trimethylindolino-6'-nitrobenzopyrolospiran.

3. The ink of claim 1, wherein the colorant is present in an amount of from 0.5 to 10 wt %, preferably from 1 to 8 wt %, based on the total weight of the ink.

4. The ink of claim 1, wherein the UV absorber is present in an amount of from 6 wt % to 12 wt %, based on the total weight of the ink.

5. The ink of claim 1, further comprising a solvent.

6. The ink of claim 5, wherein the solvent is a ketone having four carbon atoms.

7. The ink of claim 5, wherein the solvent is present in an amount of from 60 to 90 wt %, based on the total weight of the ink.

8. The ink of claim 1, further comprising a binder, wherein the binder is a cellulose resin and/or a rosin ester resin.

9. The ink of claim 8, wherein the binder is present in an amount of from 5 to 15 wt %, based on the total weight of the ink.

10. The ink of claim 1, further comprising an additive, wherein the additive is a polyether siloxane copolymer.

11. The ink of claim 10, wherein the additive is present in an amount of from 0.1 to 2 wt %, based on the total weight of the ink.

12. The ink of claim 1, further comprising a salt, wherein the salt is an ammonium salt and/or a bromide salt.

13. The ink of claim 12, wherein the salt is present in an amount of from 0.5 to 5 wt %, based on the total weight of the ink.

14. The ink of claim 1, wherein the ink has a viscosity of from 2 to 6 cP, at 25° C.

15. The ink of claim 1, wherein the ink has a conductivity of more than 450 μS/cm.

16. A deposit comprising the ink of claim 1.

17. An article comprising the deposit of claim 16.

18. An article according to claim 17, wherein the article comprises food packaging and/or drink packaging.

19. A cartridge comprising the ink of claim 1.

20. A time temperature indicator comprising the ink of claim 1.

21. A method of activating the time-temperature indicator of claim 20, comprising:
   providing the ink of claim 1 on a substrate; and exposing the ink and/or the deposit to UV light.

22. The method of claim 21, wherein the UV light has a wavelength from 300 to 450 nm, preferably from 350 to 400 nm.

23. The method of claim 21, wherein the UV light is provided at an intensity of at least 1.5 W/cm², preferably at least 2 W/cm².

24. The method of claim 21, wherein the ink is provided by inkjet printing.

25. A method of producing an inkjet ink, the method comprising:
mixing a photo-chromic colorant with a UV absorber;
wherein the colorant is a spiropyran, and
wherein the UV absorber is at least one of an acrylic resin and a styrene maleic anhydride copolymer, and wherein the UV absorber is present in an amount of from 6 wt % to 1 wt %, based on the total weight of the ink.

26. A method of using the ink of claim 1 as a time temperature indicator.

27. The ink of claim 25, wherein the spiropyran is selected from 1,3,3-trimethylindolino-6'-nitrobenzopyrolospiran, 1,3-dihydro-1,3,3-trimethylspiro[2H-indole-2,3'-[3H]naphtho[2,1-b][1,4]oxazine], 1',3'-dihydro-8-methoxy-1',3',3'-trimethyl-6-nitrospiro[2H-1-benzopyran-2,2'-(2H)-indole], 3,3-diphenyl-3H-naphtho[2,1-b]pyran, or mixtures of one or more thereof, preferably wherein the spiropyran is 1,3,3-trimethylindolino-6'-nitrobenzopyrolospiran.

28. The method of claim 25 further comprising:
providing the ink on a substrate; and
exposing the ink to UV light;
wherein the UV light has a wavelength of from 300 to 450 nm and the UV light is provided at an intensity of at least 1.5 W/cm$^2$.

* * * * *

UNITED STATES PATENT AND TRADEMARK OFFICE
CERTIFICATE OF CORRECTION

PATENT NO. : 10,583,666 B2  
APPLICATION NO. : 15/510354  
DATED : March 10, 2020  
INVENTOR(S) : Bourdin et al.

Page 1 of 1

It is certified that error appears in the above-identified patent and that said Letters Patent is hereby corrected as shown below:

In the Specification

Column 9, Line 37:
"$(dC/S_c')^2$" should be — $(dC'/S_c')^2$ —

Column 10, Line 5:
"$(C_2'-C_1')$" should be — $(C_2'\ C_1')$ —

Column 10, Line 15:
"," should be — . —

In the Claims

Column 15, Claim 25, Line 10:
"1" should be — 15 —

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*